(12) United States Patent
Haan

(10) Patent No.: US 9,073,600 B2
(45) Date of Patent: Jul. 7, 2015

(54) DUAL DRIVE BICYCLE

(71) Applicant: Kenneth Dalton Haan, Fort Lauderdale, FL (US)

(72) Inventor: Kenneth Dalton Haan, Fort Lauderdale, FL (US)

( * ) Notice: Subject to any disclaimer, the term of this patent is extended or adjusted under 35 U.S.C. 154(b) by 0 days.

(21) Appl. No.: 13/968,353

(22) Filed: Aug. 15, 2013

(65) Prior Publication Data

US 2014/0125032 A1    May 8, 2014

Related U.S. Application Data

(60) Provisional application No. 61/721,921, filed on Nov. 2, 2012.

(51) Int. Cl.
*B62M 1/14* (2006.01)
*B62M 1/12* (2006.01)

(52) U.S. Cl.
CPC ... *B62M 1/12* (2013.01); *B62M 1/14* (2013.01)

(58) Field of Classification Search
CPC .................................. B62M 1/14; B62M 1/12
USPC ........................ 280/249, 234, 232, 233, 245
See application file for complete search history.

(56) References Cited

U.S. PATENT DOCUMENTS

| | | | |
|---|---|---|---|
| 3,848,891 A * | 11/1974 | Vittori | 280/250 |
| 4,417,742 A * | 11/1983 | Intengan | 280/234 |
| 4,685,692 A * | 8/1987 | Fullilove et al. | 280/234 |
| 4,773,662 A | 9/1988 | Phillips | |
| 5,078,416 A | 1/1992 | Keyes | |
| 5,116,070 A * | 5/1992 | Becoat | 280/259 |
| 5,328,195 A | 7/1994 | Sommer | |
| 5,385,359 A | 1/1995 | Ehbar | |
| 5,431,614 A * | 7/1995 | Jeranson | 482/57 |
| 5,472,392 A | 12/1995 | Haan | |
| 5,542,689 A | 8/1996 | Chalfant | |
| 6,099,009 A | 8/2000 | Schroeder | |
| 6,264,224 B1 | 7/2001 | Phillips | |
| 6,827,362 B2 | 12/2004 | Smith | |
| 7,410,278 B2 * | 8/2008 | Kitamura | 362/473 |
| 8,876,135 B2 * | 11/2014 | Kim | 280/234 |
| 2008/0238021 A1 * | 10/2008 | Cynn | 280/234 |
| 2008/0290628 A1 | 11/2008 | Tulpan | |
| 2010/0059963 A1 | 3/2010 | Liao | |

* cited by examiner

*Primary Examiner* — Joseph Rocca
*Assistant Examiner* — Marlon Arce
(74) *Attorney, Agent, or Firm* — Roberts Mlotkowski Safran & Cole P.C.

(57) ABSTRACT

An independent shaft driven front wheel drive transmission (20) powers the front wheel of a velocipede by rotating a pair of coextensive handles (23 L R). Standard foot pedals power a rear shaft drive assembly (17) or a standard chain drive (FIG. 9). Forward rotation of the handles sets in motion the shaft driver assembly (10). The drive shaft (35) rotates and transfers energy to the multi-geared front hub assembly (14) that drives the front wheel forward. Triple tree brackets (73), position and support the front forks and steer tube. The steer tube (24) in combination with the triple tree brackets attaches the front wheel shaft drive system to the head tube of the velocipede. The modified front fork tube (53 R) houses the drive shaft (35) and bearings, (56 *a b*). The fork tube also has an attached modified drop out (77) that has clearance for rotatable bottom gear (51).

26 Claims, 6 Drawing Sheets

DUAL DRIVE BICYCLE

BACKGROUND OF THE INVENTION

1. Field of Invention

This invention relates to bicycles, specifically to an improved independent front wheel drive transmission system that is hand pedaled and drives the front wheel.

2. Description of the Related Art

All previous attempts at commercializing a bicycle that is powered by the hands as well as the feet have utilized cumbersome chains, derailleurs and multiple sprockets. There are none available in the marketplace because adding a front wheel drive that looks good and yet functions well has thus far proved to be the marketplace challenge.

Sometimes less is more. The recent popularity of fixed gear bicycles is a case in point. The fixed gear trend is an outcry for the simpler version of the standard bicycle. Simplifying the front wheel drive invention by removing chains and sprockets in combination with hiding the shaft drive within the front fork makes for a bicycle with less exposed moving parts and a more commercially acceptable product. In addition, internal shifting hubs with coaster brakes allow for the removal of costly rotating brake levers and attached cables. Combining these internal shifting hubs with an integrated front wheel shaft drive creates a simple yet functional alternative to conventional multi-sprocket drives with lever actuated brakes. My invention will work with lever brakes, but, I think less is more in this case.

I was partners with Phillips for his initial dual drive bicycle invention, U.S. Pat. No. 4,773,662 in 1988. I loved the concept of getting the upper body involved in cycling. Unfortunately, the dual drive bike was not successful because the huge chain driven sprocket was right in your face while pedaling your arms. Phillips later U.S. Pat. No. 6,264,224 merely provided smaller chains with a protective cover. Cumbersome chain tensioners and multiple sprockets were still part of his preferred embodiments. Prior art failed to simplify the front wheel drive assembly and failed to integrate it into the design of the bicycle front fork. All known prior art continued to use chains and the resulting front wheel appendages were not commercially accepted. Like Phillips, all prior art added a chain driven device that dropped down straight to the front axle without concern for head tube angle or the front fork angle thus the flow of the bike design was disrupted. I was a co-inventor with Phillips, for U.S. Pat. No. 5,472,392, Haan et al. It discloses a rear mount bicycle trainer and it does not pertain to this invention. U.S. Pat. No. 5,328,195 to Sommer, discloses a front chain ratchet system that powers the rear drive only and no independent front wheel drive. U.S. Pat. No. 6,099,009 to Schroeder, discloses a clutch and locking pin device and also discloses a chain driven front wheel.

U.S. Pat. No. 5,542,224 to Chalfant also discloses cumbersome chains and sprockets and rocks the handles back and forth to drive the front wheel. This invention also met with no commercial success. U.S. Pat. No. 5,385,359 to Ehrbar, attempts to stabilize the front wheel drive by providing a resting area for the chest. This defeats the purpose of exercising the stomach and back muscles. A spring dampener of our invention assists front wheel stabilization. Ehrbar does not solve the prior art problems of cumbersome chains, derailleurs and sprockets. U.S. Pat. No. 6,827,362 to Smith et al. discloses a foot powered only shaft driven bicycle that uses the frame of the bicycle for the casing of his dual drive invention. Smith does not use an independent hand driven front wheel drive.

Objects and Advantages

Accordingly, several objects and advantages of my invention are to provide a bicycle with two independent drive systems where the front wheel drive is hand pedaled and the rear drive is foot pedaled and both utilize drive shafts and gears to transmit power to a bicycle.

It is further object of this invention to provide a dual drive bicycle with less exposed moving parts that utilizes no chains, sprockets or derailleurs.

It is a further object of this invention to provide a front wheel drive that conforms to the geometry of the bike by utilizing the tube or blade of the dual crown front fork as the casing for the drive shaft. The dual crown center steer tube of the triple tree set-up, slides into and is fixed to the head tube of the bicycle via standard headsets well known in the industry. The parallel tubes and steer tube are fixed in place with two and sometimes three crowns. Sliding the steer tube into the head tube of the bicycle maintains the factory set head tube angle and the overall geometry of the bicycle is not compromised by adding the dual crown front wheel drive assembly. The look of the dual drive bicycle is improved by adding the dual crown set-up versus traditional forks. Our goal is to improve the look of a traditional bicycle by integrating the shaft drive within a known accessory in the bike industry as shown in FIG. 9.

It is another object of this invention to provide a modified front fork drop out that fixes the front fork to the axle of the front wheel. The drop out has clearance for the rotatable gear at the bottom of the drive shaft and a slot that fits partially around the front axle.

It is a further object of this invention to provide a low maintenance dual drive solution to cycling by replacing both chain drives with two fully enclosed shaft drives.

It is yet another object of this invention to provide a shaft drive that either fits the steer tube or utilizes the existing front fork or one that replaces everything from the head tube forward. The latter kit replaces the existing front forks with a dual crown or triple tree support frame. The frame supports: rotating adjustable handlebars, a top and bottom case, a drive shaft, a rotary transmission and attaches a new front wheel. The front wheel freewheels and has a gear attached to it.

It is a further object of this invention to provide exercise for the upper body while enjoying an outdoor bicycle ride. Providing aerobic movement and multiple resting positions for the arms stops the arm muscles from fatiguing or cramping when stuck in one position on long rides. You see riders all the time gripping the handle bars in weird positions to give their back, neck and arm muscles a break.

It is a further object of this invention to provide adjustable handles for the front wheel drive that allows adjustments for different size torsos and a variety of comfortable positions that at the same time exercises different muscle groups by lengthening or widening the reach.

It is a further object of this invention to provide an attachment area for a docking station for a smart phone hook-up and speakers located on or around the upper casing of the front wheel conversion kit.

It is a further object of this invention to provide a coaster brake for the rear drive with an internal geared hub to simplify and limit the number of moving parts and eliminate the need for rotating brake levers and cables attached to the rotatable handles.

It is a further object of this invention to provide a variable geared internal front hub that senses speed and automatically kicks into a higher or lower gear in the front wheel without the need for manual shifting and accompanying cables.

It is a further object of this invention to provide other known automatic shifting devices for both the front and rear drives so there are not multiple cables and shift lever attachments and to make the ride more enjoyable.

It is a further object of this invention to provide width adjustable front forks for bicycles that adjust like binoculars and lock in position for different width front hubs.

It is a further object of this invention to provide a locking pin that is thumb activated and located on the handles to lock the handles in a plurality of comfortable stationary positions.

It is a further object of this invention to include internal planetary gearing along the drive shaft to facilitate shifting to different gear ratios. This would eliminate the need for a shifter cable running down to the front hub and eliminate internal gearing in the front hub. Use of a planetary gear set is also advantageous because it keeps the size of the gears smaller at the top case. Tire replacement also becomes easier when internal shifting hubs are not used. The planetary type shifting mechanisms for increasing and decreasing gear ratios are well known in the bicycle industry and are also well known for other applications.

It is another object of this invention to add a dampener such as a spring, which connects the steerable lower crown to the down tube of the bicycle which would assist in keeping the front wheel straight.

It is another object of this invention to provide a more comfortable ride than the prior dual drive art by adding front shocks to the front wheel drive system by replacing the left and right crank arms with known piston type shocks, gas shocks or spring type shocks that act as both shock absorbers and crank arms.

It is yet another object of this invention to provide multiple gearing for both shaft drives front and rear and accompany them with the known lever actuated caliper brakes that rotate with the handles without entanglement. The marketplace may demand such a set up as hand lever actuated caliper brakes and disc brakes are more popular than simpler more cost effective coaster brakes.

It is a further object of this invention to provide a commercially acceptable dual drive bicycle by integrating the front drive shaft into the very design of the front forks and eliminate the use of chains, tensioners and derailleurs.

Other objects and advantages will become apparent from the following disclosure and appended claims.

Figure 1:
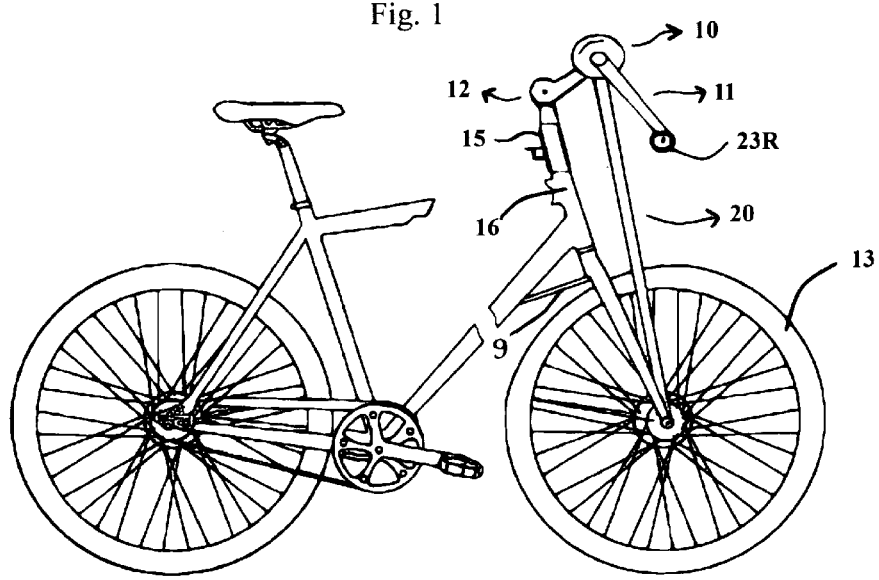
FIG. 1 is perspective right side view of a conventional bicycle. An independent front wheel drive that is shaft driven and powered by hand pedals is shown.

NUMBERS: 8 TO 78 CORRESPONDING TO
FIGS. 1-10, > DESIGNATE ASSEMBLIES

8. Shifter cable
9. Spring dampener
10. >Shaft Driver Assembly; includes top bevel gear set, drive shaft, bearings
11. >Hand Crank Handle Bar System; includes handles, bearings arms and crank shaft
12. >Stem Assembly; includes adjustable riser, stem clamp and elongated stem
13. Front wheel
14. >Multi-geared Front Hub Assembly; includes bottom bevel gear set and multi geared hub
15. Elongated stem
16. Head tube
17. >Rear Shaft Drive Assembly
18. Hand crank shaft
19. Front Fork
20. >Front Wheel Drive System Conversion Kit; Includes 10-15
21. Modified triple tree front fork
22. Top case or upper support
23. Handle LR
24. Steering tube
25. Shifter
26. Shaft drive tube
27 Stem clamp
28. Clamp bolt
29. Elongated stem
30. Adjustable stem riser
31. Receiving holes
32. Hand crank arm
33. Grease nipple
34. Stem extender clevis bolt
35. Drive shaft
36. Crank shaft bearings a b
37. Driver gear
38. Alignment grips RL
39. Locking pin
40. Female case member
41. Handle bearings a b, R
42. Handle bearings a b, L
43. Top gear
44. Male member on stem riser
45 Thumb shifter
46. Pulleys a b
47. Shifter cable
48. Shock absorber compression spring
49. Axle
50. >Transmission Assembly
51. Bottom gear
52. Hub gear
53. Triple tree fork tube R L 54. >Triple Tree Support Frame Assembly; includes triple tree brackets, two extended modified fork tubes, a steer tube, a modified dropout, top case and bottom case
55. Bottom case
56. Gear hub bearings a b
57. Alignment holes
58. Front axle bearings a b
59. Axle bolts a b
60. Ratchet pivot joint RL
61. Ratchet pivot joint RL
62. Shaft tube coupler 62
63. Coupler bearings a b
64. Smart phone docking station
65. Smart mounting bracket
66. Data in wire
67. Rain cover
68. Sealed slide able camera opening
69. Smart phone
70. Plate
71. Fork plate alignment holes
72. Alignment bearings a b
73. Triple tree bracket or crown
74. T pipe connector
75. RF antenna
76. Head tube angle
77. Modified drop out
78. Drive shaft bolt

DETAILED DESCRIPTION OF THE INVENTION AND PREFERRED EMBODIMENTS THEREOF

The invention is a dual drive bicycle that has an independent shaft driven front wheel drive transmission system that is powered by rotation of a pair of adjustable hand pedals. Traditional foot pedals power the rear wheel. The hand pedals replace the handle bars and are also used for steering. Further details are provided below.

FIG. 1 shows a dual drive bicycle that has an independent shaft driven front wheel drive system 20 that powers a front wheel 13. Traditional chain and foot pedals drive the rear wheel. An adjustable stem extender 12 is clamped to an elongated steer tube 15 that fits a head tube 16 of traditional bicycles. A hand and crank handlebar assembly 11 is connected to a hand crank shaft 18 and powers the front wheel by rotating the handle bars in a clockwise direction. A Shaft Driver Assembly 10 is operatively connected to a multi-geared front hub assembly 14. A spring dampener 9 is connected at one end to the frame of the bicycle and at the other end to the front fork by those skilled in the art. This addition helps keep the front end straight especially when using a kickstand. The preferred embodiment of FIG. 1 utilizes a coaster brake type of braking system where one pedals backwards slightly to brake. Handles 23 RL are rotatable and power a front wheel 13. There are several types of braking systems that utilize conventional hand levers and associated cables. Caliper and internal hub brakes all require the addition of costly brake levers and cables. The coaster brake in my opinion is the ideal mechanism for safely braking a bicycle with rotating handle bars. The preferred embodiment of FIG. 1 is the most cost effective dual drive version with no expensive brake levers and cables. Just one shaft drive for the front and one single sprocket chain drive for the rear. Preferably the rear hub is a seven or nine geared internal shifting hub. The internal hub braking is adapted to work as a coaster brake. The front hub preferably utilizes a five or seven geared internal hub. If more gears are required, a standard triple sprocket chain ring is added with accompanying hand lever braking systems and derailleur by those skilled in the art.

Figure 2:
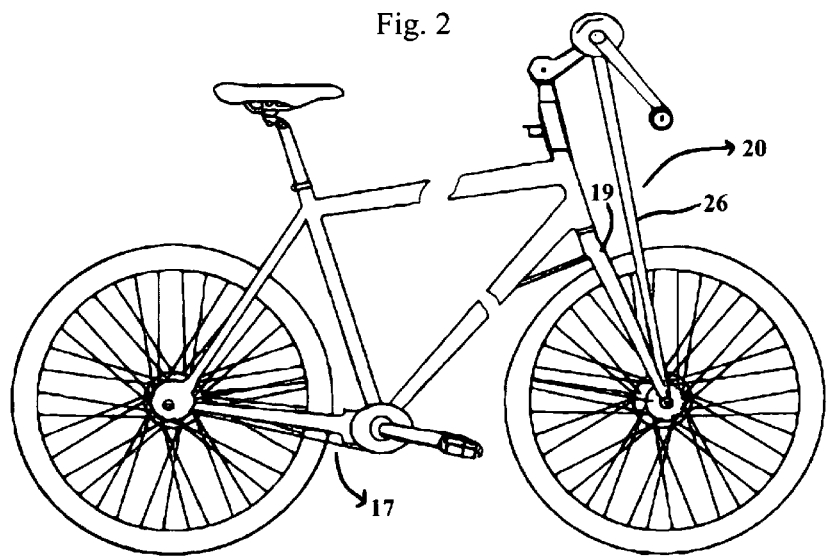
FIG. 2 is a view of the right side of a dual drive shaft driven chainless bicycle, whereby both the front and rear drives utilize a drive shaft transmission instead of a chain drive.

FIG. 2 shows a chainless dual drive bicycle. A rear drive shaft assembly 17 replaces the traditional chain drive. An independent hand pedaled, shaft driven, front wheel drive system 20 is installed on the front end. The traditional handle bars and front wheel are replaced with front shaft drive system 20. This preferred embodiment is totally chainless and utilizes an existing front fork 19 for attaching the front wheel to the bicycle. Both front and rear shaft drives employ bevel gear sets, drive shafts and modified multi-geared hubs. Spring dampener 9 is provided to increase stability. Further details of the invention are provided in FIG. 3-7. There are several manufacturers (Sussex LTD) that currently manufacture shaft drives for the rear of a bicycle. Sussex LTD is skilled in the art of shaft drives working with and attaching to multi-geared internal hubs. These type hubs are the preferred embodiment of this invention.

Figure 3:
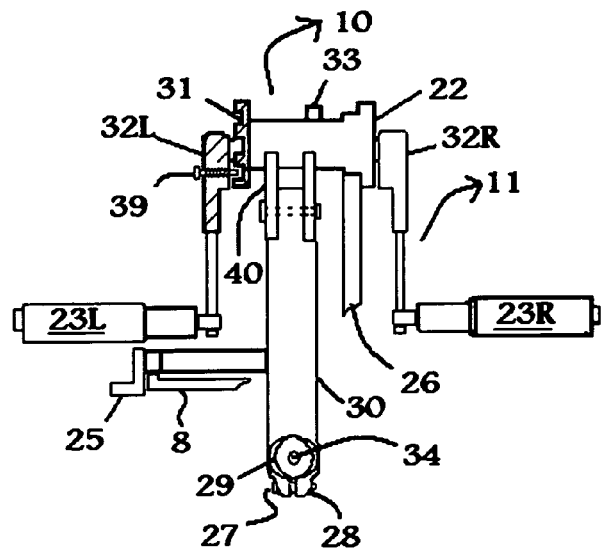
FIG. 3 is a perspective top view showing a handle and crank handlebar system and a driver gear casing with an adjustable stem extender attached.

FIG. 3 is a perspective view of front shaft drive assembly 10, comprising dual handlebar system 11 and a top case or upper support 22. Handle bar system 11 comprises rotatable handles 23 (LR) connected to a pair of hand crank arms 32 (L R). Two crank arms 32 LR are attached at right angles to a hand crankshaft 18 and axially aligned. Handles 23 LR are attached at right angles to LR crank arms. The handles are coextensive. In comparison, the foot pedals are in opposing positions. A front wheel drive cannot be ridden safely with handles in opposing positions like foot pedals. The handles, when not in use, are positioned similar to the traditional handlebars. Turning and coasting is performed just like the traditional bicycle. Case 22 has a plurality of receiving holes 31 and a recessed 360 degree guiding groove, not shown. A locking pin 39 is spring loaded is attached to the left crank arm and when released, aligns with receiving holes 31 in case 22 to lock the handles. Case holes are located on either the left or the right side. Preferably end caps not shown are added to the case at both ends. The receiving holes are drilled or formed in the end cap. The end caps have a through hole for crank shaft 18. A tube case 26 is attached to top case 22 and houses a drive shaft 35. A female member 40 attaches to the mating member of an adjustable stem riser 30. A shifter 25 and a shift cable 8 are operatively associated and are used to change the gears of the front multi-geared hub of the front wheel. A grease nipple 33 is also part of the top support and used as access to grease the housed gears. A common grease gun is used to lubricate the gears periodically.

Detailed Description

Figure 4:
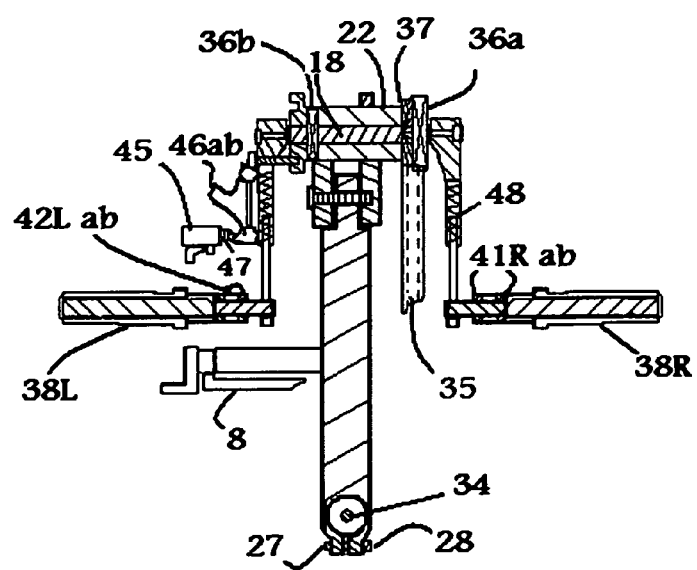
FIG. 4 is a sectional view of FIG. 3 showing an additional detent shifter attached to a hand crank, also shows foam alignment grips and also shows crank arms used as a shock absorber.

FIG. 4 is a section view of the shaft drive assembly, handlebar system and an adjustable stem riser. Crankshaft case 22 is the structural support for the crankshaft 18 and a driver gear 37. The handles attach to the crank arms by a set of freely rotatable bearings 41 R ab and 42 L ab. The arms attach to the crankshaft which has a set of bearings 36 ab, one at each end of the crankshaft. A top gear 43 (FIG. 5) is also housed in case 22 and meshes with driver gear 37. Top gear 43 is attached to the top end of drive shaft 35. Forward rotation of the handle causes rotation of driver gear 37 which in turn causes rotation of the top gear and connected drive shaft 35. Stem assembly 12 attaches the crankshaft case 22 to the head tube and comprises the following: A female member 40 extends out from case 22 at a downward angle toward the stem socket. A male member 44 of the stem riser is a clevis type joint and mates with female member connected to the top case. This forms an adjustable joint and is secured by a bolt 34. A clamp 27 at the other end clamps an elongated stem 29 by a bolt and nut 28 ab.

Elongated stem 29 inserts into the steering tube 24 and is secured by a stem expansion bolt 34. Stem clamp 27 is adjustable vertically. A thumb shifter 45 is another preferred embodiment operatively associated with a locking pin 39 that is spring loaded. Shifter 45 is attached to the crank 32L and a shifter cable 47 and a pulley 46 a b. They are operatively associated with locking pin 39. Shifter 45 is locked and loaded during normal rotation of the handles. Pressing thumb shifter releases spring loaded locking pin 39 and it is urged inward to engage holes 31 in the crank case and locks the handles in place. The handle can be locked in a plurality of different positions. Crank arms 32 R L house a shock absorber compression spring 48. Spring 48 is meant to be illustrative of the crank arm having a dual purpose. Shock absorbers by those skilled in the art are utilized as crank arms. A preferred embodiment for shock absorber 48 is a gas-piston shock 8 inches in length. A shock absorber as a crank arm absorbs vibrations and sudden forward shifts in weight if the rider goes over a curb. It is important for the longevity of the front wheel shaft drive system to soften downward blows and jars to the front axle and gear sets.

A pair of alignment grips 38 slides onto the handles. Grip 38 is finger formed similar to a golfer grip training aid. The end of grip 38 closest to the crank arm or ones thumb is formed to locate and stiffly hold a hand lever brake cable during rotation so there is no entanglement. Hand brakes are an option but coaster brakes are preferred. The handles are rotatable. The alignment grip assures that the grip and levers are always aligned for safety. During rotation, the brake levers are always aligned at your fingertips.

Figure 5:
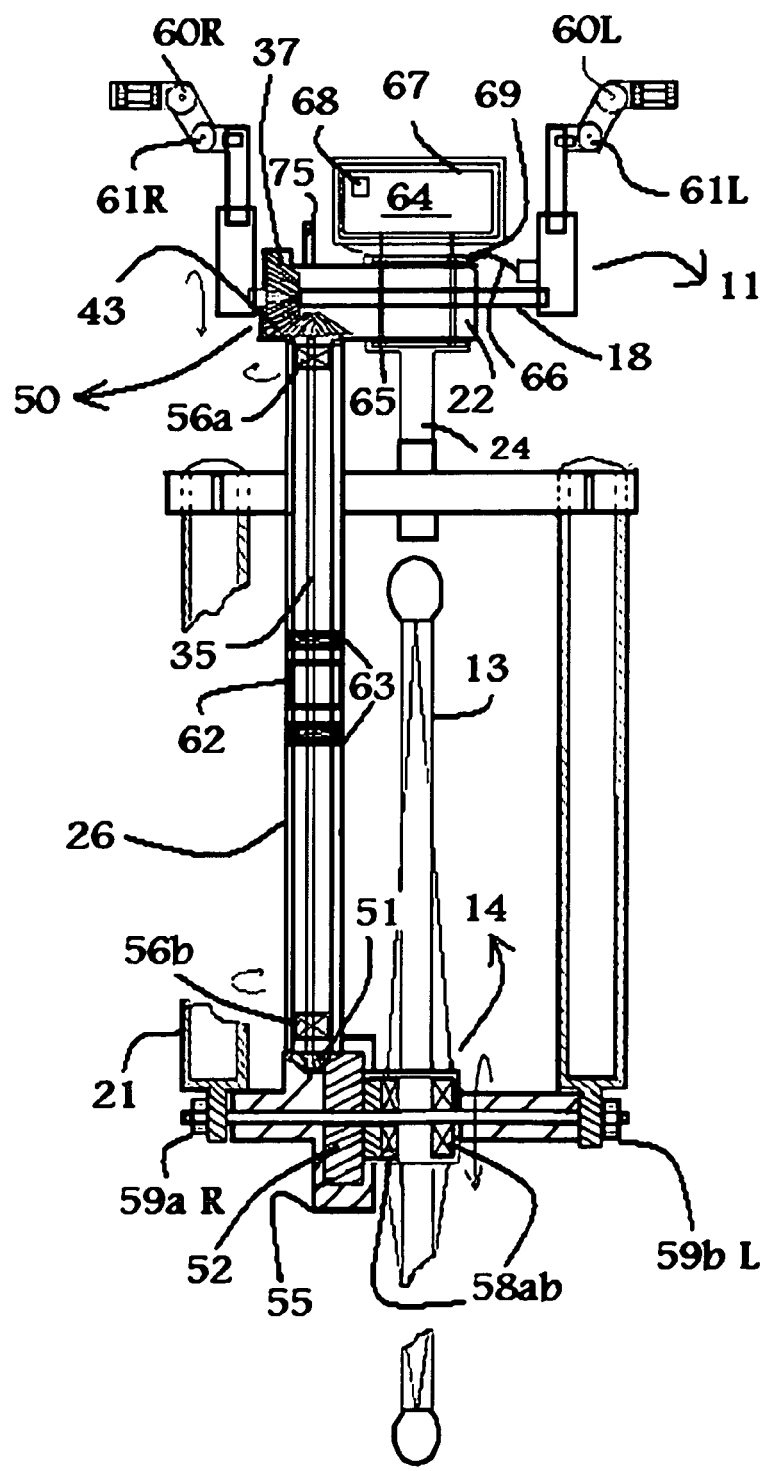
FIG. 5 is a sectional frontal view of a front wheel drive assembly that shows a smart phone and docking station, adjustable handles and direct attachment of the top case to the steer tube is also illustrated.

FIG. 5 is a cross sectional frontal view of conversion kit 20 comprising front wheel 13 supported by a modified front triple tree fork 21. A singular triple tree fork 21 is modified by increasing its width to accommodate the bottom gear set. A steering tube 24 is attached to the adjustable stem assembly and the steer tube attaches the front wheel drive to the bicycle. Hand crank system 11 drives a transmission assembly 50. The front wheel has a multi-geared front hub 14 laced to it. Transmission 50 includes: crankshaft 18, large driver gear 37, a top bevel gear 43, drive shaft 35, a bottom bevel gear 51 and a hub gear 52. Attached to the hub portion of the top and bottom gears is a gear hub bearing 56 a b. Hub bearings 56 a b are press fit into shaft drive tube and align the gears and drive shaft. Rotation of the handles powers the driver gear which imparts rotational energy to top and bottom connected gears. The drive shaft operatively connects both top and bottom gears to the driven gear attached to the hub. The bottom gear of the drive shaft engages and transmits rotation to the gear connected to the front hub and drives the front wheel forward. The drive shaft is positioned inside drive shaft tube 26 in this embodiment.

Detailed Description

In FIG. 5, case 22 and bottom case 55 are attached to drive shaft tube 26. Case 55 covers and protects multi geared front hub assembly 14. Axle 49 has a front axle bearing 58 a b. Modified triple T front fork 21 connects to axle 49 and is secured by an axle nut 59L and 59R. Another preferred embodiment is a shaft tube coupler 62. Coupler 62 joins a split shaft tube case 26. A coupler bearing set 63 a b is added to help stabilize the drive shaft and dampen any vibration by those skilled in the art. A bracket clamps 67, see FIG. 7, secures the fork and the drive shaft. Preferably more than one bracket is used to secure the drive shaft and tube. Referring to the top of FIG. 5, a preferred embodiment 24R and 24L has pivoting ratchet joint 60RL and 61RL. The first pivot area extends out from the arms axially as shown. Ratchet joints are common and used to adjust stem extensions in the industry. A clicking noise during adjustment assists mutual left and right alignment and is preferable by those skilled in the art. The handle ratchet joints facilitate the adjustment of the handle bars for length and width and range of motion. Adjustable handles enables a custom fit to the arm length, torso length and shoulder width of male or female riders. Comfort and also the exercising of different muscle areas is an important function for an exercise bicycle of the present invention. During demonstrations, the ability to adjust the arm length is as important as seat height adjustment. Common clevis joints, male/female, and other movable joints by those skilled in the art replace the more expensive ratchet type 60 and 61. A clevis joint or other known joint is added at the stem clamp area for further lengthwise adjustment of the stem riser as another preferred embodiment if needed. Another preferred embodiment utilizes the end of crank arm 32 as the male member (U joint) and first pivot area. The handles extend out in a radial direction from the first pivot point 60 LR and are connected to the second pivot area 61 LR. The arms and handles are already both rotatable allowing multiple adjustable positioning of the handles and arms. Another preferred embodiment utilizes a ball joint pivot. Smart phone docking station 69 is located between the crank arms and attached by a crank case mounting bracket 65. A phone connecter 66 for electronic hookup and data transmission of multiple varieties connects to the docking station. A data in cable 66 connects all on board sensory or charging devices to smart phone 64. The smart phone replaces the traditional computer that tracks distance, speed and time. The faster processors and advanced capabilities of smart phone 64 allow limitless information to be tracked and displayed in color. The ability to add bicycle apps will only enhance the bicycling experience. A clear protective rain cover 67 preferably has a sealed slide able camera opening 68 for the camera eye. Opening 68 allows on board video and picture taking. Shimano recently introduced $2000 electronic shifters. Verbal commands via blue tooth communication with smart phone 64 hooked into the docking station is now possible.

Detailed Description

Another preferred embodiment of the present invention has automatic shifting hubs. Yet another preferred embodiment has electronic shifting mechanisms for the front wheel drive unit. In combination with the smart phone one will be able to use verbal shift commands and the electronic shifters will shift via blue tooth. The dual drive bicycle burns more calories by working more muscle groups. The on screen heat visualization will become the best means of promoting and selling the dual drive chainless exercise bicycle. Outdoor speakers and speaker brackets, not shown, controlled by smart phone 64 is another preferred embodiment of the dual shaft drive conversion kit. A small solar powered rf transmitter or router 75 turns the bicycle into a wireless network. Top case 22 is modified with tapped and capped lower threaded mounting buds for smart phone speakers. The case is also modified with built in slide on mounts that fit and firmly support various sized smart phones. The case is wide enough to also have built in mounts for tablets, portrait view. These are not shown in the drawings but will be part of castings for the modified case. Another preferred embodiment of case 22 has built in headlights and side lights.

Figure 6:
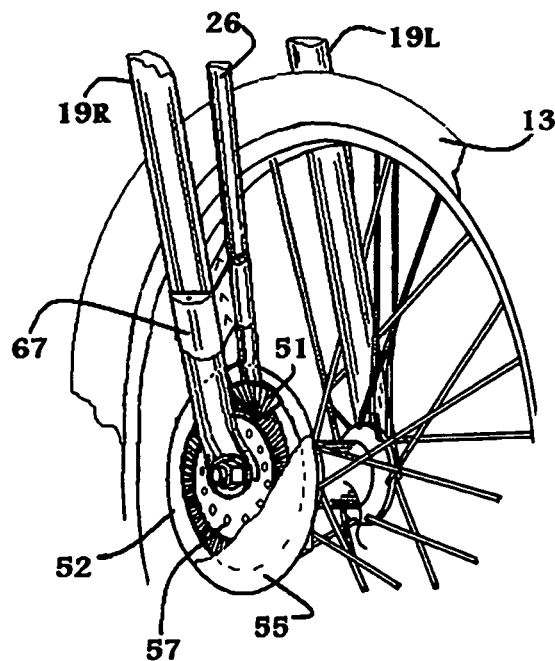
FIG. 6 is an enlarged perspective right side view showing the front wheel with the bottom case exposed to illustrate the bottom bevel gear set.

FIG. 6 is an enlarged side view of front wheel 13 showing front fork 19 and a partially exposed bottom case 55. A support bracket 67 secures shaft drive tube 26 to the front fork. Preferably more than one bracket 67 is used to secure in more than one location up the shaft. The small bevel gear at the end of the drive shaft engages the larger driven bevel gear. The crank case houses both gears and attaches to hub 14 via a plurality of alignment holes 57 and bolts. The hub has corresponding alignment holes. Another preferred embodiment of the front fork is manufactured with half of bracket 67 welded to the right fork that attaches to the other receiving half that attaches to the hub.

Figure 7:
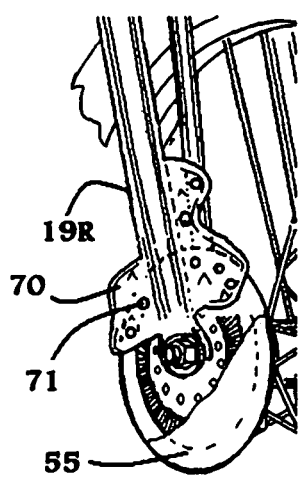
FIG. 7 is a side view showing a modified front right fork with alignment holes to receive and secure a bottom crank case.

FIG. 7 is side view of modified front fork 19 including a plate 70 welded to the fork. Plate 70 has an alignment hole 71. Preferably plate 70 has numerous alignment holes 71 that align with outside holes (not shown) of bottom crank case 55. Bolts are used (not shown) to firmly attach the right fork plate to the bottom case. The case is secured in by an axle nut 59.

Figure 9:
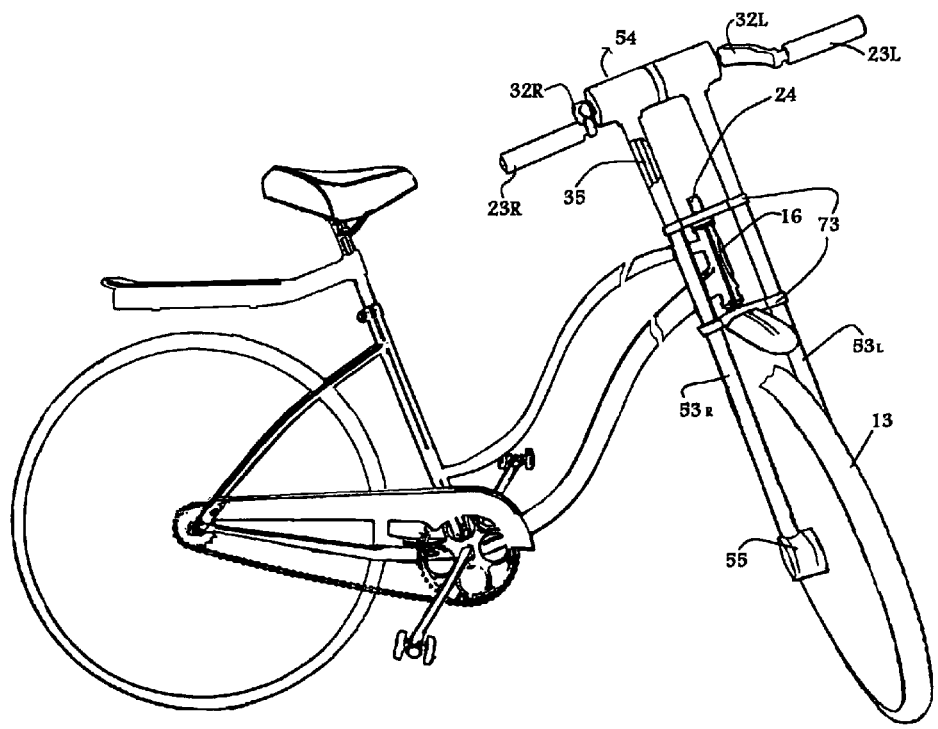
FIG. 9 is a side view of a dual drive bicycle with the handles and triple tree front support turned forward showing the shaft drive conversion kit with the top case directly attached to the fork tubes

It is of note that FIG. 5 illustrated the use of one, dual crown or triple tree front fork bracket for the first time but the right fork was not used to house the drive shaft. FIGS. 1 and 2 illustrate the use of traditional front forks with an attached steer tube. FIGS. 1 to 7 show the drive shaft tube 26 attached directly to the top case a. The top case is attached, as is traditional, to the handlebar stem which inserts into the steer tube. The drive shaft tube is shown in FIG. 5 as a separate element housing the drive shaft 35. The drive shaft is not integrated within the front fork for these embodiments. As a distinction, FIG. 9 shows the functional use of two extended front fork tubes, the right fork tube houses the drive shaft and both tubes support the top case and attach the front wheel drive to the head tube. FIG. 9 also shows the traditional front forks 19 are replaced with a triple tree support frame assembly 54.

Figure 8:
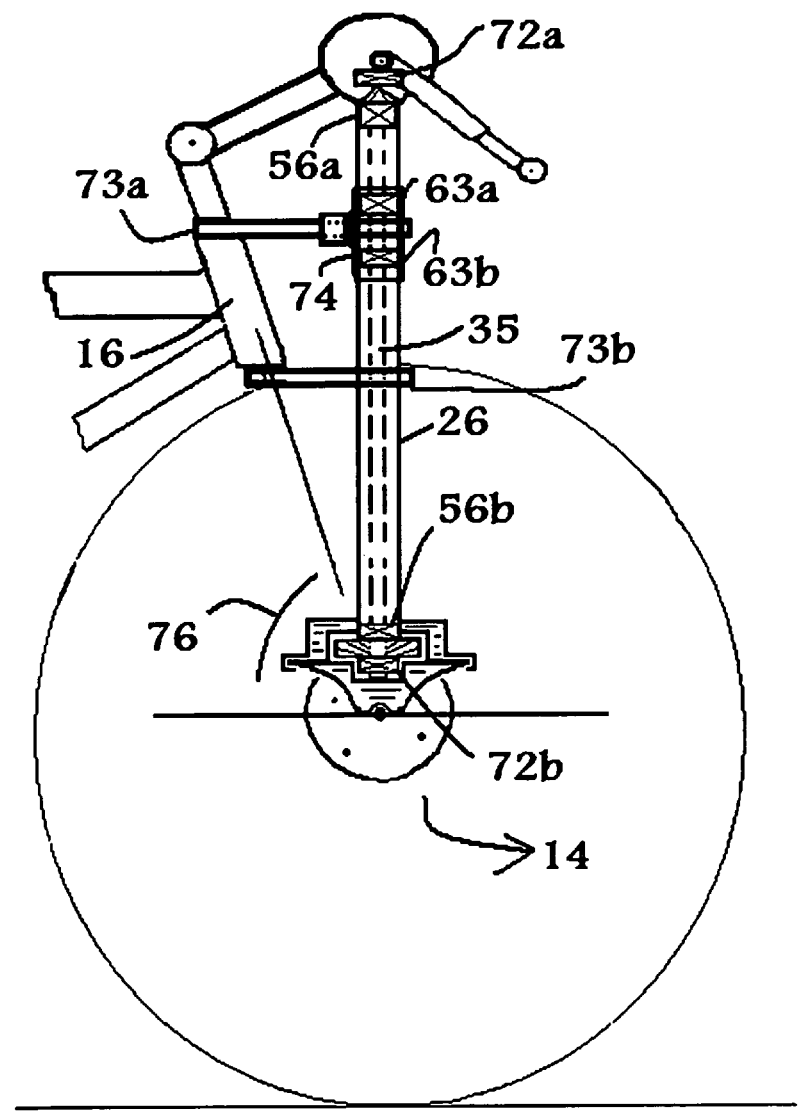
FIG. 8 is a sectional view of the front wheel showing the drive shaft located inside the front fork and head angle of 72 degrees.
Figure 10:
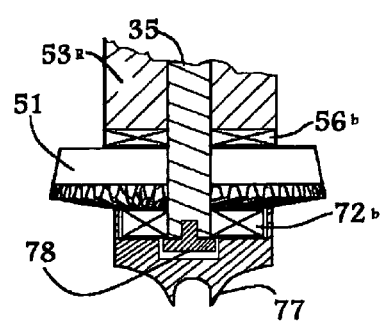
FIG. 10 is a sectional view showing an improved right side dropout.

FIG. 8 is cross sectional side view of another preferred embodiment showing the shaft drive 35 routed inside a triple tree fork tube 53 R. Triple tree fork tube 53 R L replaces traditional fork 19 and part of shaft tube 26, for this embodiment. Forks 53 RL are part of a triple tree or dual crown front fork design and known in the industry. A modified drop 77 is shown with the top part welded to the fork tube. Bottom part of drop out 77 has an opening for clearance of rotating gear 51. The bottom section is bolted or quick connected to the top welded on part of the drop out. FIG. 10 shows another embodiment of the modified drop out. When we build our first prototype it will be determined if we can attach the fork tubes directly to or case 22, see FIG. 9. The triple tree bracket attaches both front forks and steering tube at the top and bottom of the head tube. The top case 22 attaches to the steer tube. Tube 26 and drive shaft 35 drop down from case 22 and align with a T pipe connector 74. The T connection is a seamless three way tube connection that is common by those skilled in the art. In this embodiment, the T pipe connector connects case 26, fork tube 53 and the triple tree bracket 73. A set of coupler bearings 63 *a b*, are added above and below the T connector. If it is possible for triple tree forks 53 RL to connect directly to the top case then no T coupler or coupler bearing are needed. During prototype development various embodiments will be tested. See FIG. 9 for our first prototype and the extended triple tree fork tubes 53 R L attaching directly to the top case, negating the need for the T pipe connector and coupler bearings 63 *a b*.

Detailed Description

A set of alignment bearings 72 *a b*, are added above the top bevel gear and below the bottom bevel gear. The drive shaft housed within the front fork tube increases the overall structural strength. The modified front fork is wider to accept a multi-geared hub and the bottom gear set. Cases 22 and 55 are modified for fixed placement and alignment of added alignment bearings 72 *a b* that are seated above and below the bevel gears. Case 22 and 55 have other added features built in. For example, engineers will design small strip like structures or ribs mounted in the gear box cases to facilitate better heat dissipation. Solid structures to hold the bearings will also be formed in the internal part of a two part case by those skilled in the art. As a result there will be less vibration and better gear meshing and easy solid placement of bearings. The engineered design will be both strong and aesthetically pleasing. The preferred embodiment of the outside of case 22 has all known accessory mounts engineered into the casting, molded or machined part for proper securing and placement of option items. These include receiving studs for smart phone, brackets to fit and hold the larger tablets, speakers, grease fittings and more than one threaded stud to attach bottle cages, baskets and all accessories known. Threaded studs are often found on front forks for adding caliper brakes and are part of our front fork design.

Head tube angle 76 is also known as the steering axis. The head tube is hollow and slide ably receives the steer tube. In this embodiment, FIG. 8, the angle is 72 degrees. A line is drawn down the middle of the head tube to the ground. The head tube angle is a variable set by the manufacturer for the frame geometry of the bicycle and is determined by those skilled in the art. This angle influences stability in combination with fork off-set by controlling wheel flop. Wheel flop is the tendency of the wheel to turn when leaned. A steep angle of 72 degrees for example is more upright and takes less effort to steer and makes the bicycle more agile. It is important to keep the geometry of the bicycle within certain ranges when dealing with forks and offsets and head angles by those skilled in the art. A steep angle also keeps the wheel going straight when climbing a hill. The front wheel drive of the present embodiment utilizes the steer tube that slides into the head tube for attachment to any bicycle.

An old school EARLES front fork shock absorbing design is another preferred embodiment where the fork meets the axle, not shown. There are many other types of known link suspensions for the front wheel. Girder forks, leading and trailing links, and COTTON forks are some examples of potential modifications that would dampen potential damaging jars to the beveled gears by those skilled in the art. Utilizing the hand crank arms as a shock absorbing suspensions is one simple solution already mentioned. During prototype development the right combination will be tried and tested.

Detailed Description

FIG. 9 is side view of a women's single speed beach cruiser with the handles 23 R L turned outward to show a triple tree support frame assembly 54. The independent shaft driven front wheel drive system 20 replaces the standard handle bars, front fork and front wheel. The steer tube 24, of the front drive assembly is simply slid into the head tube 16. The triple tree brackets 73 clamp the steer tube and the left and right fork tubes 53 above and below the head tube. The crank arms 32 LR are attached to an axle in the top casing. The top case joins the top of both forks and acts as a third structural bracket and upper support. The top case also acts as the housing for the hand crank assembly. The drive shaft 35 is housed by the right side fork tube 53 that extends above the head tube and attaches directly to the top case 22 in this preferred embodiment. The front wheel 13 has a free wheel type front hub and a gear attached to it that meshes with a mating gear connected to the bottom of the drive shaft. The 90 degree bevel gear set is manufactured and sold together as a set meshing pair. The gear is attached to the hub by sliding ii on precut grooves or splines or keyways and attaching it with a lock ring. Another embodiment uses male and female threads for attachment of the gear to the front hub. Still another embodiment modifies the hub and attaches the gear to it.

For this preferred embodiment we used a 3:1 top gear set and a 3:2 bottom gear set at the hub to achieve and overall fixed ratio of 4½:1. We did not use an internal shifting front hub nor finger lever actuated brakes and cables. We used a simple coaster brake on the rear wheel. Most coastal areas are relatively flat so, this simplified version of the dual drive beach cruiser is ideal and the added power of the front wheel shaft drive is more than enough power assist for any hill climbing. As shown in FIG. 9 the triple tree integrated design adds to the overall look and aesthetics of the cruiser and its simplicity is the direction the fixed gear enthusiast have already taken the bicycle industry.

Our first prototype and preferred embodiment as shown in FIG. 9, illustrates how the modified triple tree front fork functions as the ideal support frame assembly 54 for the front wheel drive system. Integration of the drive shaft within the right side front fork maintains the head tube angle and overall geometry of the bicycle.

We used two PVC reducing tees from the plumbing department to inexpensively build the top case prototype. We joined the PVC tees with a short piece of PVC pipe. The right angle reducing tee drops down portions are spaced to receive the fork tubes and coincide with the predetermined spacing of the triple tree brackets. The top of each fork has male threads and is threaded into the reducing tees which had female threads. There are many other known tube attachment solutions by those skilled in the art and this is but one described embodiment. End caps with axle openings, not shown, were bolted on each end. The end caps are firmly secured to the top case to keep the driver gear axially positioned. This prevents any axial thrust of the top gear set. One end cap has the crank arm locking holes drilled, formed or casted in it. Any strong lightweight material that is suitable, replaces the PVC tees by those skilled in the art. We used an off the shelf triple tree front fork assembly and modified the extended fork tubes. The forks and steer tube are hollow and made of steel and the crowns or brackets are metal plates made of forged or stamped aluminum. The triple tee brackets have three spaced round openings that clamp the tubes. In this embodiment, the clamp utilized a threaded bolt to close the openings and tighten around the tubes. Other known quick release clamps are used for another embodiment of the triple tree brackets. The steer tube opening is centered and the fork tube openings extend outward forming an insoles triangle of sorts. The left and right fork tubes and the steer tubes slide through the openings and are clamped in place by tightening the clamping bolts not shown. This type of triple tree or dual crown fork assembly is well known in the bicycle industry.

The forks are made width adjustable by adding a known clevis type joint and bolt to the brackets, not shown. The adjustment is similar to binocular adjustment whereby both fork tubes adjust widthwise while the steer tube remains centered. Attaching the two fork tubes to the top case and connecting the steer tube through and above and below the head tube, make it a structurally sound steering apparatus. Threading the tubes into the top case also allowed for the top gear and driver gear to be vertically aligned and tested. Critical measurement information for mass production was gathered. Once the threaded travel distance for the top gear is known, then the exact tube length with predetermined stops are added for faster assembly with less variables. Other known tube attachments devices can be utilized.

An extended steer tube and a third triple tree bracket 73, not shown, is added at the top case for additional structure as another preferred embodiment. FIG. 9 shows the utilization of top case 22 as the third bracket and is the preferred embodiment. The right side front fork tube is modified to receive and press fit the top and bottom bearings. The right side front fork also houses and protects the drive shaft so no rotating parts are exposed. The bearings fit the hub portion of the top and bottom gears. The right side front fork also has a modified drop out 77 that has clearance for a rotatable gear as seen in FIG. 10. The support frame assembly 54 maintains the head tube angle and the integrity of the overall design of the bicycle. The triple tree front shaft drive design will work with any style bicycle or tricycle and the bicycle shown in FIG. 9 is not meant to limit the invention but is merely illustrative.

FIG. 10 is a sectional view of another embodiment of drop out 77. The drop out is used for easy attachment and alignment of the right side front fork 53 to the hub axle. The drive shaft 35 extends through bearing 56b, bottom gear 51 and bearing 72b. The gear and bearing are attached by a bolt 78 to the drive shaft. The aluminum or steel dropout housing is machined of formed to fit around bearing 72. The dropout being able to rotate around the bearing made axle alignment and attachment easy after finding the correct alignment of the top gear and driver gear. The dropout is machined, formed or casted to fit around the axle of the front wheel and is bolted in place as is standard in the industry. There are other suitable materials and other embodiments that will clear the gear and attach the fork to the axle. A two part dropout is another preferred embodiment, not shown. One part of the dropout is welded to the front fork or is a plug in type and the other part is attached to it with bolts, threads or a quick connect. The first part is attached to the fork tube and has an opening wide enough for clearance of gear rotation. The second part has a slot for the front axle. The drop out is bolted to the front axle as normal in the bike industry.

Operation of the Invention

In operation, the shaft driven front wheel drive conversion kit #20, of the present invention replaces the front fork, handlebars and front wheel. The front wheel is replaced with a freewheel type of hub. The preferred embodiment as shown in FIG. 9, illustrates how well the new shaft driven dual drive design is integrated into the geometry of the bike. Utilizing the right side tube of the triple tree or dual crown front fork assembly as the housing for the drive shaft is a functional way to also cover and obscure a rotating part. The integration of the drive shaft within the front fork negates the need for adding multiple brackets #67, as seen in FIG. 6. The top casing actually acts as a third bracket when attached to the top of both fork tubes making the whole front wheel drive framework structurally stronger.

The preferred embodiment of FIG. 9 is set up with a single speed rear chain drive bicycle with a coaster brake. Unencumbering the bicycle by removing all rotating brake levers and brake cables also gives it a cleaner sleeker appearance. A prototype of the subject invention was built as shown in FIG. 9. To illustrate the simplicity of this front wheel drive conversion kit and its versatility it was slid into the head tube of a single speed beach cruiser with coaster brakes. Standard industry head tubes have either threaded headsets or threadless headsets, not shown. The headsets vary in sizes to fit 25 mm to 37 mm diameter head tubes and matching steer tubes. Both types are well known in the industry and secure and attach the steer tube of the fork to the frame or head tube #16 of the bicycle. The front forks, like the frame of the bicycle can be made of steel, aluminum, composite or other strong lightweight known materials. Aluminum can be powder coated in different colors or anodized in different colors.

To ride the dual drive invention you hop on the bicycle and start pedaling the rear drive with your feet as normal. You start out simply holding the parallel handles #23 LR in a down position. Once forward speed is established your natural bicycle balance is easier to maintain and you can now start pedaling with your arms. Rotating handles #23 LR, sets in motion hand crank system #11 and the top shaft driver assembly #10. The forward rotation of the handles results in added power and forward rotation of the front wheel. The addition of hand power adds 3-5 mph to the overall speed of the bicycle. There seems to be a need for a bicycle power assist as evidenced by the electric motor sales in the USA. The use of the arms as a natural power assist makes for the ideal exercise bicycle and fills an obvious void in the industry.

The beveled gear sets at the top and bottom of the connected drive shaft, for this embodiment, are standard 90 degree matched factory gear sets. The rotating drive shaft causes bottom connected gear #51 to rotate and mesh with the driven gear #52 that is fixed to the front wheel hub. The front wheel is driven forward and rotates in a clockwise forward direction.

The preferred embodiment of FIG. 9, has a gear ratio that is higher than that of the legs. The favored gear ratio for the arms on a dual drive bicycle is between 4:1 and 6:1 depending on the wheel size and individual. There are many known ways to accomplish different gear ratios by those skilled in the art. Using different ratios of gear sets at the top and bottom of the drive shaft is one example. Accompanying these with internal shifting hubs or by locating a planetary gear shifting mechanism along the drive shaft is another preferred embodiment to add multiple gear selection. It is not our intent to limit this invention by the above or below mentioned mechanisms as there are numerous known gear ratio shifting devices and gear types. It is our intent to be illustrative, not restrictive with all aspects of this application.

Operation of the Invention

Another preferred embodiment uses a 2:1 gear ratio at the top and 2.5:1 at the bottom of the drive shaft. Matched 90 degree bevel gear sets are the preferred embodiment. This allows for reduced sized casings and thus, less overall weight is added to the bicycle. The added power of the front drive system increases the speed of the bicycle and assists the legs in uphill climbing. Using both the arms and the legs to power the bicycle provides the rider with a total body workout and increases cardiovascular intensity.

Another preferred embodiment is a totally chainless dual drive bicycle, FIG. 2, one that has a shaft drive in the rear and a shaft drive in the front. One or both wheels can have multi geared internal shifting hubs. Another chain-less embodiment utilizes traditional brake and shift levers and cables. Popular disc or wheel rim brakes and grip shifters and cables that are common in the bicycle industry can be used with the front wheel drive system. Multiple gearing is a necessary add on if you live in a mountainous region. Living in a flat state such as Florida and most beach areas enables a simpler set up as illustrated in FIG. 9. In FIG. 9, the rear chain drive is single speed and the front shaft drive is also single speed. The gear ratios are set for a comfortable flat surface speed. A 3:1 ratio at the top bevel gear set and a 3:2 gear ratio for the bottom gear set, results in a preferred ratio of 4½:1 for 26 to 29 inch front wheels. The use of a 3:1 ratio for the top gear set and a 2:1 ratio at the hub, results in an overall 6:1 gear ratio. This higher ratio is preferred when using a 7 speed internal shifting front hub that mostly downshifts to lower gears. The front wheel drive is excellent for assisting in hill climbing and the rider can remain seated.

Another preferred embodiment uses a rear chain drive attached to an internal shifting hub that uses a coaster brake. FIG. 1 illustrates how no moving brake levers and brake cables are necessary and yet you have multiple gearing in the rear hub. The independent front drive system can either be set up with just a fixed 4:1 gear ratio or combined with multiple gear selection mechanisms. There are many options and combinations but sometimes less is more. Keeping the riding experience simple while getting a total aerobic workout is the best solution to the various options and my goal for this fitness invention. Whichever options are chosen, the front wheel drive system 20, will work with any bicycle or tricycle.

FIG. 5 illustrates improvements such as adjustable handles with pivot joints 60, 61, for different rider's torsos. The adjustable handles are also used to work slightly different muscles by varying the width. The shock absorbing cranks FIG. 4, #48 make for a more comfortable ride and less stress on the frame of the bike when going over curbs. The thumb shifter 45 in FIG. 4, is yet another improvement for the subject shaft driven dual drive bicycle for convenient ease of use of the locking pin to lock the handles in a plurality positions.

FIG. 10 shows an improved right fork dropout. The tube of the right side fork is also the casing for the drive shaft. It is attached to the top casing using threads. This threaded attachment allows for longitudinal adjustment for the meshing of the top gear with the driver gear. The hub of the top gear 43 is slip fit into bearing 56a which is press fit into the top of the modified right side tube of the front fork. The tube or blade can also be slid into the top case to a predetermined stop that aligns with the driver gear and fixedly attached. This attachment can be done in numerous ways by those skilled in the art of gear alignment. When the ideal threaded alignment is located for the top gear set, the slot of the welded on drop out at the bottom end of the fork is often not aligned properly to mate with the hub axle. To solve this problem, another bearing was added below bottom gear #51 and the drive shaft was made longer to receive it. The improved dropout is formed to fit around and house bearing #72 b and the extension of the drive shaft. A bottom slot is also part of the housing and is formed, casted or stamped to fit around the hub axle and bolted to the axle as known. Mounting the dropout around the bearing allows the dropout to have 360 degree rotation. Bottom gear clearance is now a non-issue. This improved drop out design makes fork attachment, gear replacement and gear alignment a much simpler process and lowers manufacturing and assembly costs.

Another drop out embodiment utilizes a quick connect type fastener. A plate with receiving ears and an opening is welded or screwed onto the right fork. The opening is for the rotatable bottom gear. The receiving ears are for a quick connect of a second plate with mating ears. The second plate has an arched slot that fits the axle. The quick connect dropout is bolted to the front axle.

Another dropout embodiment is a simple sideways U welded to the front fork. It is designed with a slot for the front axle. Instead of welding it, a quick connect is used for attachment to the fork.

My goal with this invention is to provide an improved dual drive fitness bicycle by removing all cumbersome greasy chains and their accompanying derailleurs and tensioners. Another goal is to make improvements that are easily assembled and easily mass produced. Combining my shaft driven front wheel drive system to known rear shaft driven bicycles creates a chain-less dual drive fitness bicycle. The sleek new functional design is free from any exposed grease and moving parts. Utilizing triple tree brackets and modified extended front forks as the frame, support, and housing for the front wheel shaft drive system adds some funk and makes this fitness bicycle more acceptable in the marketplace. Triathletes can combine their swimming and cycling training because powering the front wheel simulates the butterfly stroke. A new total body fitness category for cycling will be born.

SUMMARY OF THE INVENTION

The invention comprises a velocipede having an independent shaft drive system for both the front and rear wheel. The rear drive is powered by the feet. The front drive is powered by the hands. The net result is a total body fitness bicycle whereby the chain drives are replaced by shaft drives. Replacing all cumbersome and greasy chains and derailleurs solves most of the common complaints of bicycle riders. The handles are aligned axially and are coextensive, not opposed like the foot pedals. The handles have the added benefit of multiple resting positions that can be locked in place. Both drives perform well with conventional braking and gear changing mechanisms.

The invention also comprises a housing and support for a front wheel shaft drive for a velocipede. The front drive shaft is ideally hidden and housed by the right side tube of a triple tree or dual crown front fork. The use of a triple tree front fork set-up allows for integration of the drive shaft into the design of the bicycle. A plurality of triple tree or dual crown brackets are used to firmly hold and support the fork tubes and steer tube and these, together, act as the frame work for the invention as seen in the preferred embodiment of FIG. 9. The dual fork tubes support the top casing and the right fork supports the bottom casing. Each gear at the top and bottom of the drive shaft uses a bearing to locate and facilitate rotation of the drive shaft. The right side front fork tube is utilized to press fit the bearings within the tube. The right side fork tube has enough wall thickness tom press fit the bearings and maintain structural strength. This functional use of a modified triple tree front fork design allows for easy integration of the shaft drive while maintaining the geometry of the bicycle frame. The right side drop out is modified for clearance of the rotatable bottom gear and is bolted to the front axle. A quick connect type of fastener allows for easy access to the bottom gear. The quick connect is preferably a mating twist on twist off type well known by those skilled in the art. Another preferred dropout embodiment includes housing with an arched slot at one end. The housing fits over an additional bearing located below the bottom gear, as seen in FIG. 10. The dropout is then bolted to the hub axle as standard.

The invention also consists of a shaft driven front wheel drive conversion kit that connects to any velocipede via the head tube. The conversion kit includes:

(a) a steerable front wheel that freewheels and has an attached gear;

(b) a modified triple tree front fork assembly with two fork tubes, a steer tube and two or more three way brackets, the brackets have receiving holes for the steer and fork tubes that clamp and position the tubes;

(c) a modified drop out that allows for clearance of a rotatable gear attached to the bottom end of said fork tube and allows for easy front wheel attachment;

(d) a hand crank and rotary transmission system that includes a drive shaft, the drive shaft is housed by one of the fork tubes;

(e) a top case or upper support for the handle crank system and a top 90 degree gear set; the upper support has attachment holes with female threads that receive the male threaded top ends of both fork tubes; the upper support joins the fork tubes at right angles to the underside of the top case at spaced locations coinciding with the spaced locations of the fork tube receiving holes of the triple tree brackets, so as to be able to support the top case horizontally.

The front drive assembly is made of strong light-weight materials known in the industry such as aluminum, steel, titanium and composites or combinations thereof. While my above description contains some specific details, these should not be construed as limitations on the scope of the invention but rather as exemplifications of a preferred embodiment. Many other variations are possible. For example a second shaft drive assembly can be added to the left side fork of the front wheel. An electric motor is added to the front hub as yet another preferred embodiment. Accordingly, the scope of the invention should not be determined by the embodiments illustrated or described, but by the appended claims and their legal equivalents.

I claim:

1. A dual-drive velocipede, comprising:
    a frame having a rear wheel rotatably mounted therein, and a foot-pedal mechanism connected to the rear wheel via a drive train that transfers energy from the feet of a rider to the rear wheel;
    a steering assembly including a front fork having a front wheel rotatably mounted therein, a steering tube connected to the front fork, and a pivot joint pivotally connecting the steering tube to a front portion of the frame, and
    a front drive transmission system that transfers energy from the arms of a rider to the front wheel, including:
        a case member connected to one of the steering tube and the front fork;
        a horizontally-oriented crank shaft rotatably mounted in the case member;
        a pair of hand cranks mounted on opposite ends of the hand crank shaft, and
        a gear train including a vertically-oriented drive shaft that connects a rotational output of the crank shaft to the front wheel,
        wherein the case member is connected to the upper end of the front fork, the front fork has left and right fork members disposed on opposing sides of the front wheel, and one of said fork members provides a housing for the vertically-oriented drive shaft of the gear train, and
        wherein the fork member that provides the housing for the vertically-oriented drive shaft of the gear train is a hollow tubular member that surrounds the drive shaft, and the front fork is a dual crown, triple tree fork.

2. The dual-drive velocipede defined in claim 1, wherein the gear train further has a pair of right-angle gears, including a first right-angle gear connected to a distal end of the drive shaft and a second right-angle gear connected to the front wheel for transmitting a rotational output of the drive shaft to the front wheel.

3. The dual-drive velocipede defined in claim 2, wherein the first right-angle gear is partially surrounded by a gear case that is connected at its upper end to a distal end of the fork member housing the drive shaft.

4. The dual-drive velocipede defined in claim 3, wherein the gear case is attached to the distal end of the fork member housing the drive shaft by an attachment means.

5. The dual-drive velocipede defined in claim 3, wherein the gear case is connected at its lower end to a drop-out member that is in turn connected to a front wheel axle.

6. The dual-drive velocipede defined in claim 2, wherein the gear train further has a second pair of right-angle gears, including a first right-angle gear connected to the crank shaft mounted in the case member, and a second right-angle gear connected to a proximal end of the drive shaft for transmitting a rotational output of the pair of hand cranks to the drive shaft.

7. The dual-drive velocipede defined in claim 1, wherein the front fork includes at least two crown members connecting the right and left fork members in parallel.

8. The dual-drive velocipede defined in claim 7, wherein the steering tube is connected between the two crown members to stiffen the right and left fork members from twisting in response to torque, and wherein the steering tube is slidably captured within a head tube connected to said front portion of the frame to form said pivot joint.

9. The dual-drive velocipede defined in claim 1, wherein the front fork is a dual crown, triple tree fork.

10. The dual-drive velocipede defined in claim 1, wherein the gear train provides a ratio of between about 4.5 to 6 rotations of the front wheel for each rotation of the crank shaft of the front drive transmission system.

11. The dual-drive velocipede defined in claim 1, wherein the gear train further includes a planetary gear means for providing selectable gear ratios between the crank shaft and the drive shaft.

12. The dual-drive velocipede defined in claim 1, further comprising a coaster brake mounted in the frame for applying a braking force to the rear wheel when the rider operates the foot-pedal mechanism in a backwards direction.

13. The dual-drive velocipede defined in claim 1, further comprising a finger-operated brake mounted in the frame for applying a braking force to the rear wheel.

14. The dual-drive velocipede defined in claim 1, wherein the opposing hand cranks are mirror-symmetrical, and wherein the radial stroke of the hand cranks is adjustable.

15. The dual-drive velocipede defined in claim 1, wherein the opposing hand cranks include a shock absorbing mechanism that insulates the front fork from shock applied to the opposing hand cranks from the hands of a rider.

16. The dual-drive velocipede defined in claim 1, wherein the steering assembly further includes a docking station for a computer, smart phone and tablet and further includes a solar charging means for an energy source for electronic equipment.

17. The dual-drive velocipede defined in claim 1, further comprising a freewheel hub connecting the front wheel to the front fork.

18. A steering assembly for a dual-drive velocipede powered by both the feet and hands of a rider, comprising:
  a front fork having a front wheel rotatably mounted therein via a freewheeling hub;
  a steering tube connected to the front fork;
  a coupling that pivotally connects the steering tube to a front end of a frame of the velocipede, and
  a front drive transmission system that transfers energy from the arms of a rider to the front wheel, including:
    a case member connected to one of the steering tube and front fork;
    a crank shaft rotatably mounted in the case member;
    a pair of hand cranks mounted on opposite ends of the hand crank shaft, and
    a gear train including a drive shaft that connects a rotational output of the crank shaft to the front wheel,
  wherein the case member is connected to an upper end of the front fork, the front fork has left and right fork members disposed on opposing sides of the front wheel, and one of said fork members provides a housing for the drive shaft of the gear train, and
  wherein the fork member that provides the housing for the vertically-oriented drive shaft of the gear train is a hollow tubular member that surrounds the drive shaft, and the front fork is a dual crown, triple tree fork.

19. The steering assembly for a dual-drive velocipede defined in claim 18, wherein the gear train further has a pair of right-angle gears, including a first right-angle gear connected to a distal end of the drive shaft and a second right-angle gear connected to the front wheel for transmitting a rotational output of the drive shaft to the front wheel.

20. The steering assembly for a dual-drive velocipede defined in claim 19, wherein the first right-angle gear is partially surrounded by a gear case that is connected at its upper end to a distal end of the fork member housing the drive shaft.

21. The steering assembly for a dual-drive velocipede defined in claim 20, wherein the gear case is attached to the distal end of the fork member housing the drive shaft by an attachment means, and the gear case is connected at its lower end to a drop-out member that is in turn connected to a front wheel axle.

22. A dual-drive velocipede, comprising:
  a frame having a rear wheel rotatably mounted therein, and a foot-pedal mechanism connected to the rear wheel via a drive train that transfers energy from the feet of a rider to the rear wheel;
  a steering assembly including a front fork having a front wheel rotatably mounted therein, a steering tube connected to the front fork, and a pivot joint pivotally connecting the steering tube to a front portion of the frame, and
  a front drive transmission system that transfers energy from the arms of a rider to the front wheel, including:
    a case member connected to one of the steering tube and the front fork;
    a horizontally-oriented crank shaft rotatably mounted in the case member;
    a pair of hand cranks mounted on opposite ends of the hand crank shaft, and
    a gear train including a vertically-oriented drive shaft that connects a rotational output of the crank shaft to the front wheel,
  wherein the case member is connected to the upper end of the front fork, the front fork has left and right fork members disposed on opposing sides of the front wheel, and one of said fork members provides a housing for the vertically-oriented drive shaft of the gear train, and the front fork is a dual crown, triple tree fork.

23. A steering assembly for a dual-drive velocipede powered by both the feet and hands of a rider, comprising:
  a front fork having a front wheel rotatably mounted therein via a freewheeling hub;
  a steering tube connected to the front fork;
  a coupling that pivotally connects the steering tube to a front end of a frame of the velocipede, and
  a front drive transmission system that transfers energy from the arms of a rider to the front wheel, including:
    a case member connected to one of the steering tube and front fork;
    a crank shaft rotatably mounted in the case member;

a pair of hand cranks mounted on opposite ends of the hand crank shaft, and a gear train including a drive shaft that connects a rotational output of the crank shaft to the front wheel, wherein the case member is connected to an upper end of the front fork, the front fork has left and right fork members disposed on opposing sides of the front wheel, and one of said fork members provides a housing for the drive shaft of the gear train, and the front fork is a dual crown, triple tree fork.

24. A dual-drive velocipede, comprising:

a frame having a rear wheel rotatably mounted therein, and a foot-pedal mechanism connected to the rear wheel via a drive train that transfers energy from the feet of a rider to the rear wheel;

a steering assembly including a front fork having a front wheel rotatably mounted therein, a steering tube connected to the front fork, and a pivot joint pivotally connecting the steering tube to a front portion of the frame, and a front drive transmission system that transfers energy from the arms of a rider to the front wheel, including:

a case member connected to one of the steering tube and the front fork;

a horizontally-oriented crank shaft rotatably mounted in the case member;

a pair of hand cranks mounted on opposite ends of the hand crank shaft, and a gear train including a vertically-oriented drive shaft that connects a rotational output of the crank shaft to the front wheel, a drive gear connected to a distal end of the drive shaft, and a driven gear engaged to the drive gear and connected to an axle of the front wheel, wherein the case member is connected to the upper end of the front fork, the front fork has left and right fork members disposed on opposing sides of the front wheel, and one of said fork members provides a housing for the vertically-oriented drive shaft of the gear train, and wherein the drive gear is partially surrounded by a gear case that is connected between a distal end of the fork member housing the drive shaft, and the axle of the front wheel such that the drive shaft and drive gear are isolated from a compressive load applied to the fork member housing the drive shaft, and the front fork is a dual crown, triple tree fork.

25. The dual-drive velocipede defined in claim 24, further comprising upper and lower thrust bearings sandwiching the drive gear within the gear case.

26. The dual-drive velocipede defined in claim 24, further comprising an attachment means connecting a lower end of the gear case to the axle of the front wheel.

* * * * *